United States Patent
Steiger et al.

(10) Patent No.: US 11,720,071 B2
(45) Date of Patent: Aug. 8, 2023

(54) COMPUTING STOCHASTIC SIMULATION CONTROL PARAMETERS

(71) Applicant: Microsoft Technology Licensing, LLC, Redmond, WA (US)

(72) Inventors: Damian Silvio Steiger, Zurich (CH); Helmut Gottfried Katzgraber, Kirkland, WA (US); Matthias Troyer, Clyde Hill, WA (US); Christopher Anand Pattison, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/815,541

(22) Filed: Jul. 27, 2022

(65) Prior Publication Data

US 2022/0382225 A1     Dec. 1, 2022

Related U.S. Application Data

(63) Continuation of application No. 16/721,736, filed on Dec. 19, 2019, now Pat. No. 11,402,809.

(60) Provisional application No. 62/909,140, filed on Oct. 1, 2019.

(51) Int. Cl.
  *G05B 13/04*   (2006.01)
  *G06F 30/25*   (2020.01)
  *G06F 111/10*  (2020.01)

(52) U.S. Cl.
  CPC .......... *G05B 13/042* (2013.01); *G06F 30/25* (2020.01); *G06F 2111/10* (2020.01)

(58) Field of Classification Search
  CPC .... G05B 13/042; G06F 30/25; G06F 2111/10
  USPC .......................................................... 700/29
  See application file for complete search history.

(56) References Cited

U.S. PATENT DOCUMENTS

| | | | | |
|---|---|---|---|---|
| 6,049,574 A * | 4/2000 | Noonan | ............... | H04L 25/0305 375/348 |
| 9,417,349 B1 * | 8/2016 | Yu | ........................... | G01V 1/302 |
| 10,713,589 B1 * | 7/2020 | Zarandioon | ............ | G06N 20/00 |
| 2004/0039622 A1 * | 2/2004 | Masiello | .................. | H02J 3/004 703/2 |
| 2009/0006129 A1 * | 1/2009 | Thukral | .................. | G16H 20/10 705/2 |
| 2020/0006944 A1 * | 1/2020 | Fife | ......................... | H02J 3/466 |
| 2020/0143313 A1 * | 5/2020 | Ohlsson | ............... | G06Q 10/087 |

(Continued)

*Primary Examiner* — Ly D Pham
(74) *Attorney, Agent, or Firm* — Alleman Hall Creasman & Tuttle LLP

(57) ABSTRACT

A computing device is provided, including memory storing a cost function of a plurality of variables. The computing device may further include a processor configured to, for a stochastic simulation algorithm, compute a control parameter upper bound. The processor may compute a control parameter lower bound. The processor may compute a plurality of intermediate control parameter values within a control parameter range between the control parameter lower bound and the control parameter upper bound. The processor may compute an estimated minimum or an estimated maximum of the cost function using the stochastic simulation algorithm with the control parameter upper bound, the control parameter lower bound, and the plurality of intermediate control parameter values. A plurality of copies of the cost function may be simulated with a respective plurality of seed values.

20 Claims, 10 Drawing Sheets

(56) References Cited

U.S. PATENT DOCUMENTS

2021/0073291 A1* 3/2021 Hunter .................. G06N 3/045

* cited by examiner

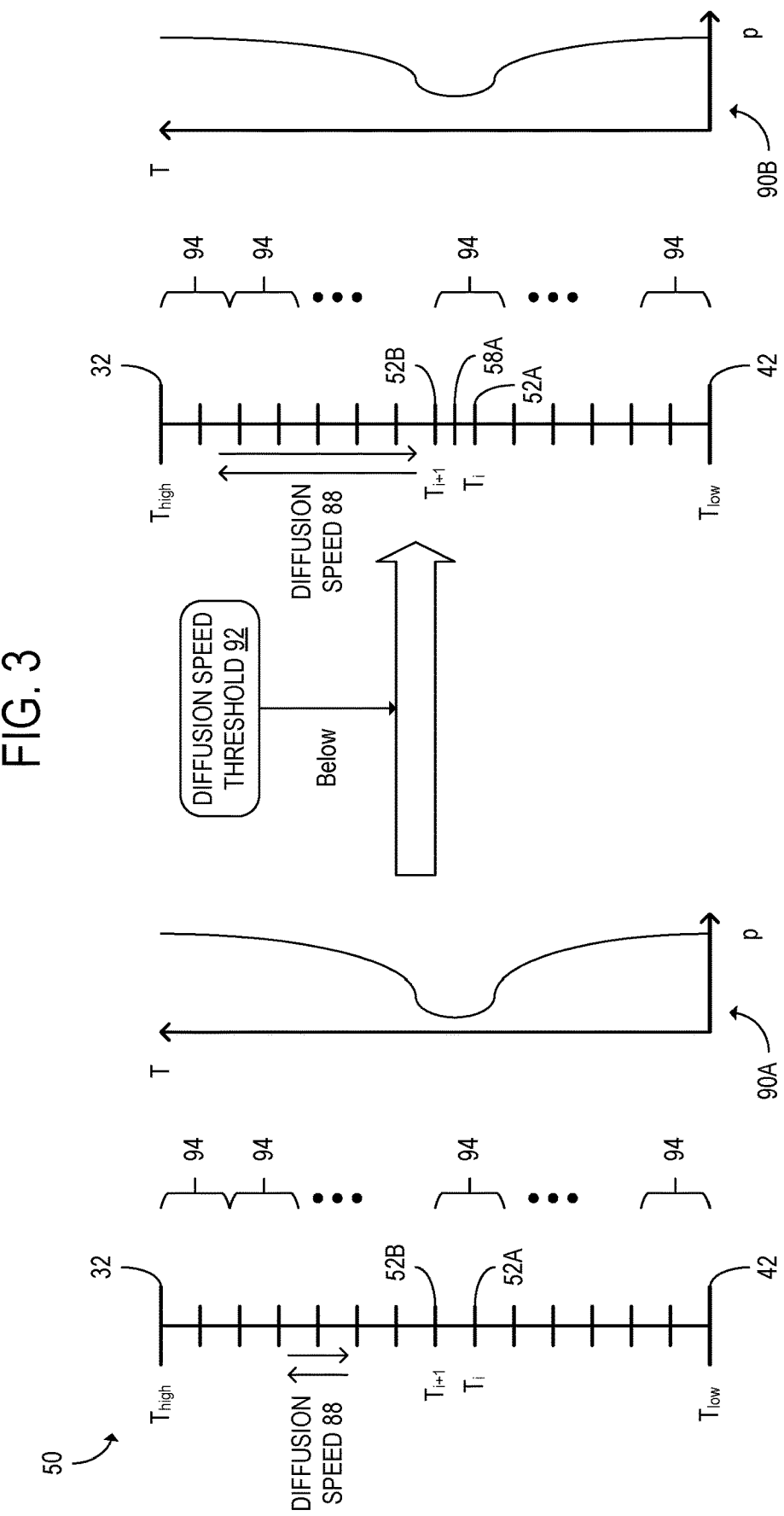

COMPUTING STOCHASTIC SIMULATION CONTROL PARAMETERS

CROSS REFERENCE TO RELATED APPLICATIONS

This application is a continuation from U.S. Non-Provisional patent application Ser. No. 16/721,736, filed Dec. 19, 2019, which claims priority to U.S. Provisional Patent Application Ser. No. 62/909,140, filed Oct. 1, 2019, the entirety of each of which is hereby incorporated herein by reference for all purposes.

BACKGROUND

In cost function optimization problems, the goal is to determine the maxima and/or minima of a function having the form $f(x_1, x_2, \ldots, x_n)$ where $x_i$ are continuous or discrete variables. Cost function optimization problems arise in a wide variety of domains including logistics, machine learning, and material design. Determining the maximum or minimum of a cost function is frequently an NP-hard problem for which it would not be feasible to find an exact solution. Instead, maxima and minima of cost functions are more frequently approximated by numerical methods. These numerical methods include stochastic methods in which random searches of the state space of the cost function are iteratively performed.

SUMMARY

According to one aspect of the present disclosure, a computing device is provided, including memory storing a cost function of a plurality of variables. The computing device may further include a processor configured to, for a stochastic simulation algorithm, compute a control parameter upper bound. The processor may be further configured to compute a control parameter lower bound. The processor may be further configured to compute a plurality of intermediate control parameter values within a control parameter range between the control parameter lower bound and the control parameter upper bound. The processor may be further configured to compute an estimated minimum or an estimated maximum of the cost function using the stochastic simulation algorithm with the control parameter upper bound, the control parameter lower bound, and the plurality of intermediate control parameter values. A plurality of copies of the cost function may be simulated with a respective plurality of seed values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows an example modification to the intermediate control parameter values of a control parameter range based on a diffusion speed, according to the embodiment of FIG. 1.

DETAILED DESCRIPTION

In existing systems and methods by which the maxima and minima of cost functions may be estimated using stochastic simulation algorithms, each stochastic simulation algorithm has a plurality of parameters that affect its behavior. For example, one such parameter may be a temperature when a parallel tempering algorithm is used. Depending on the values set for the parameters prior to executing the stochastic simulation algorithm, the cost function may approach a minimum or maximum at different rates. For some values of the parameters, the cost function may even fail to converge to its global maximum or minimum. Thus, the values set for the parameters may greatly affect the efficiency of the stochastic simulation algorithm.

Previous methods of setting the parameters of the stochastic simulation algorithm typically include selecting a small sample of test problems and testing a large number of different parameter values for the stochastic simulation algorithm as applied to the test problems in the sample. The performance of the stochastic simulation algorithm with different parameter values is then compared and the set of parameter values that solves the test problems in the sample the most quickly is selected. The stochastic simulation algorithm is given the selected set of parameter values each time it is used.

However, the above method of setting the parameters of a stochastic simulation algorithm does not account for differences in the efficiency of the stochastic simulation algorithm with the selected set of parameters for different cost functions. As a result, when the stochastic simulation algorithm is used to find a maximum or minimum of a cost function with sufficiently different behavior from the cost functions included in the test problem sample, the stochastic simulation algorithm may be highly inefficient when run with the selected set of parameter values determined based on the test problem sample. In addition, the search space of possible values of the parameters may be too large for a search based on a small number of test problems to produce values of the parameters that lead to efficient performance for the stochastic simulation algorithm.

In order to overcome the above problems, systems and methods are provided below for dynamically tuning the control parameter values of a stochastic simulation algorithm when estimating the maximum or minimum of a cost function.

Figure 1:
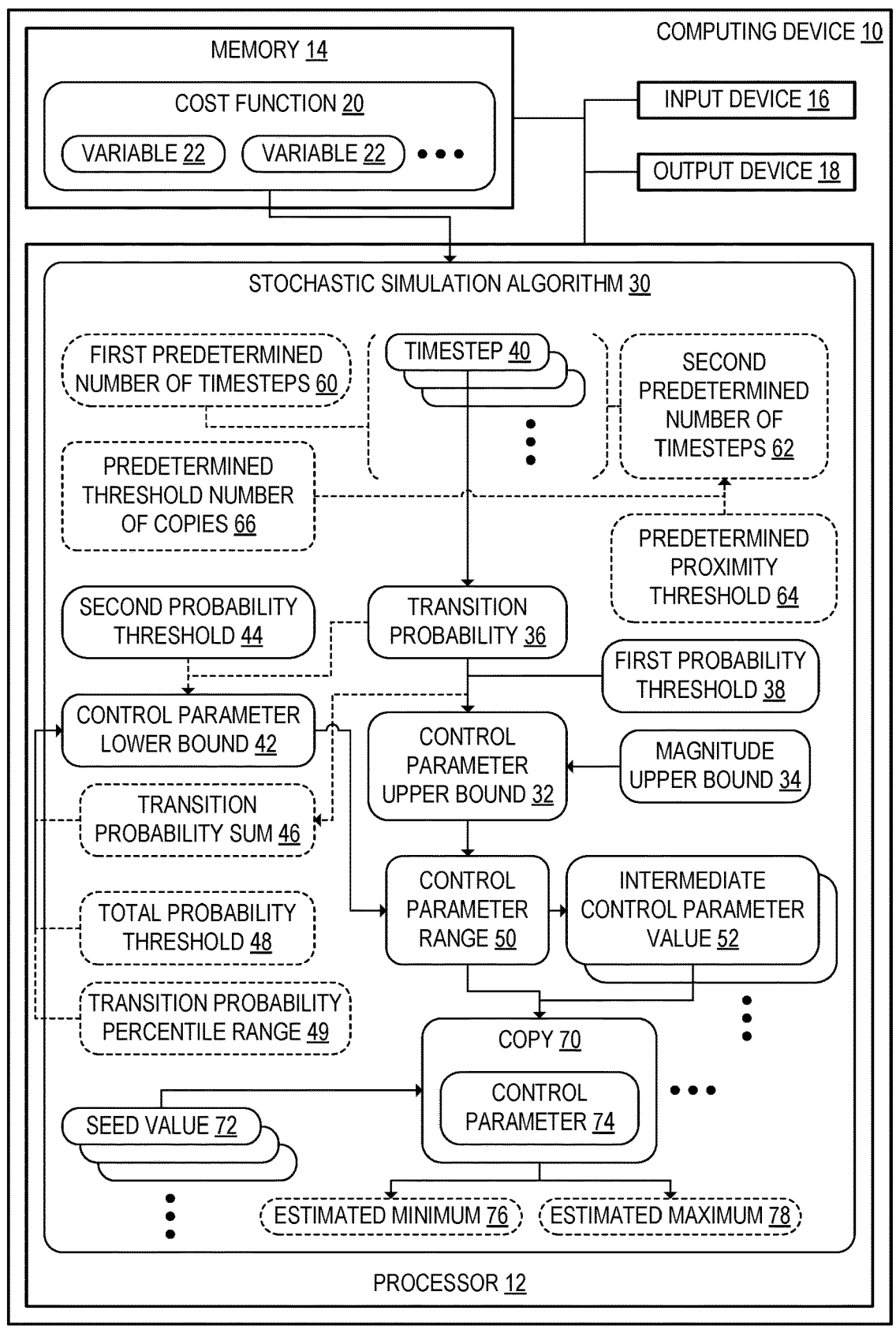
FIG. 1 schematically shows an example computing device including a processor and memory, according to one embodiment of the present disclosure.

FIG. 1 schematically shows an example computing device 10, according to one example embodiment. The computing device 10 may include a processor 12 and memory 14, which may be communicatively coupled. The computing device 10 may further include one or more input devices 16 and one or more output devices 18. Via the one or more input devices 16 and the one or more output devices 18 respectively, the computing device 10 may receive inputs from, and communicate outputs to, one or more users and/or other computing devices. In some embodiments, the functions of the computing device 10 may be distributed across a plurality of physical computing devices that are communicatively coupled via their respective input devices 16 and output devices 18.

The memory 14 of the computing device 10 may store a cost function 20 of a plurality of variables 22. Each of the variables 22 may be continuous or discrete. In some embodiments, the cost function 20 may be a combinatorial cost function in which each variable 22 is a discrete variable. The output of the cost function 20 may be a scalar.

The processor 12 may be configured to implement a stochastic simulation algorithm 30. For example, the stochastic simulation algorithm 30 may be a simulated annealing algorithm, a simulated quantum annealing algorithm, a parallel tempering algorithm, a diffusion Monte Carlo algorithm, a population annealing algorithm, or a sub-stochastic Monte Carlo algorithm. Other stochastic simulation algorithms 30 may alternatively be used. Each stochastic simulation algorithm 30 may have a plurality of control parameters 74. The specific control parameters 74 taken by the stochastic simulation algorithm 30 may depend upon the specific algorithm that is used. In embodiments in which a physics-based stochastic simulation algorithm 30 is used, a control parameter 74 of the plurality of control parameters 74 may be a temperature, a field strength, a frequency, or some combination thereof.

When the processor 12 executes the stochastic simulation algorithm 30, the processor 12 may be configured to simulate a plurality of copies 70 of the cost function 20. The plurality of copies 70 of the cost function may be simulated with a respective plurality of seed values 72, each of which may be a random or pseudorandom value. Each copy 70 may be simulated over a plurality of timesteps 40 during which one or more of the variables 22 of the cost function 20 may be updated. In addition, during each timestep 40, the processor 12 may determine whether to carry over the update to the one or more variables 22 into the next timestep 40 or to revert the one or more variables 22 to the values those variables 22 had before the update. The determination of whether to carry over the update into the next timestep 40 may be made stochastically based on which stochastic simulation algorithm 30 is used and the control parameters 74 of the stochastic simulation algorithm 30.

When computing the control parameters 74 of the stochastic simulation algorithm 30, the processor 12 may be configured to compute a control parameter upper bound 32. For example, the control parameter upper bound 32 may be a temperature upper bound. Computing the control parameter upper bound 32 may include by computing, for each variable 22 of the cost function 20, a magnitude upper bound 34 on a change in the cost function 20 resulting from an update to that variable 22. In some embodiments, the control parameter upper bound 32 may be a first control parameter value at which, for each variable 22 of the plurality of variables 22, a respective transition probability 36 of that variable during a timestep 40 performed at the first control parameter value is greater than a first probability threshold 38. Thus, in such embodiments, the control parameter upper bound 32 may be determined based on the first probability threshold 38, which acts as an upper bound on the transition probability 36.

In one example, the processor 12 may be configured to solve an unconstrained binary optimization problem using parallel tempering. In this example, the cost function 20 may be a function of a plurality of binary variables $x_i \in \{0,1\}$ with $i=1, \ldots, n$. Although, in the current example, the cost function 20 is a function of a plurality of binary variables 22, the cost function 20 may include one or more other types of discrete or continuous variables 22 in other examples. The cost function 20 for an unconstrained binary optimization problem may have the following form:

$$f(x_1, x_2, \ldots, x_n) = \sum_{i=1}^{n} c_i x_i + \sum_{i=1}^{n}\sum_{j=1}^{n} c_{ij} x_i x_j + \sum_{i=1}^{n}\sum_{j=1}^{n}\sum_{k=1}^{n} c_{ijk} x_i x_j x_k + \ldots$$

Where c are constants. In this example, the magnitude upper bound 34 on the change in the value of the cost function 20 may be given by:

$$|f(x_1, \ldots, x_i=0, \ldots, x_n) - f(x_1, \ldots, x_i=1, \ldots, x_n)|$$
$$\leq \Sigma_{\{x\}} |c_x| = b_{upper}$$

where $\{x\}$ is the set of indices which include the variable i. The value of $b_{upper}$ may then be plugged into the equation defining the transition probability 36 for parallel tempering, $$p = \min(\exp(\beta \Delta f), 1)$$

where p is the transition probability 36 and $\beta$ is an inverse temperature. The transition probability may be set to a predetermined constant (e.g. 0.5). The equation for the transition probability 36 may then be solved for the temperature to obtain the control parameter upper bound 32, in this example a temperature upper bound.

The processor 12 may be further configured to compute a control parameter lower bound 42. The control parameter lower bound 42 may be a second control parameter value at which, for one or more variables 22 of the plurality of variables 22, the respective transition probabilities 36 of the one or more variables 22 during a timestep 40 performed at the second control parameter value are each lower than a second probability threshold 44. In some embodiments, the control parameter lower bound 42 may be computed from the second probability threshold 44. Thus, in such embodiments, the second probability threshold 44 may act as a lower bound on the transition probability 36.

In some embodiments, the processor 12 may be configured to determine the control parameter lower bound 42 based at least in part on the control parameter upper bound 32. An example in which the control parameter lower bound 42 is determined based on the control parameter upper bound 32 is provided below. In this example, the stochastic simulation algorithm 30 is a simulated annealing algorithm or a parallel tempering algorithm. Simulated annealing allows updates to multiple variables to occur per timestep 40. The processor 12 may be configured to simulate one or more copies 70 of the cost function 20 with the control parameter 74 (in this example, a temperature) set to the control parameter upper bound 32. When the processor 12 simulates the one or more copies 70 over a plurality of timesteps 40, the control parameter 74 may be lowered with each successive timestep 40 until the control parameter 74 reaches the second probability threshold 44.

The processor 12 may be further configured to compute the respective transition probability 36 of each variable 22 for each of the copies 70 simulated at the control parameter upper bound 32. In some embodiments, rather than estimating the respective transition probability 36 of each variable 22 by determining a transition frequency averaged over the timesteps 40, the processor 12 may be configured to compute the respective transition probabilities 36 directly from the equation defining the transition probability 36 for the stochastic simulation algorithm 30. The processor 12 may be further configured to compute a transition probability sum 46 of the respective transition probabilities 36 of the plurality of variables 22. If the transition probability sum 46 is below a total probability threshold 48, the processor 12 may be further configured to set the control parameter lower bound 42 to the control parameter 74 at which the plurality of copies 70 were simulated.

Additionally or alternatively, the processor 12 may be further configured to compute a probability that one or more variables 22 within a predefined transition probability percentile range 49 are updated per timestep 40. For example, the processor 12 may be configured to determine the probability of an update to any of the variables 22 in the top 5% most updated variables 22. If the probability of an update to a variable 22 in the predefined transition probability percentile range 49 is below the total probability threshold 48, the processor 12 may be further configured to set the control parameter lower bound 42 to the control parameter 74 at which the plurality of copies 70 were simulated.

By keeping the transition probability 36 within a range delimited by the second probability threshold 44 and the first probability threshold 38, the processor 12 may be configured to allow the copies 70 of the cost function 20 to explore a large portion of the range of possible values of the cost function 20 while still converging toward an estimated minimum 76 or an estimated maximum 78. The range between the second probability threshold 44 and the first probability threshold 38 may correspond to a control parameter range 50 between the control parameter lower bound 42 and the control parameter upper bound 32.

Figure 2:
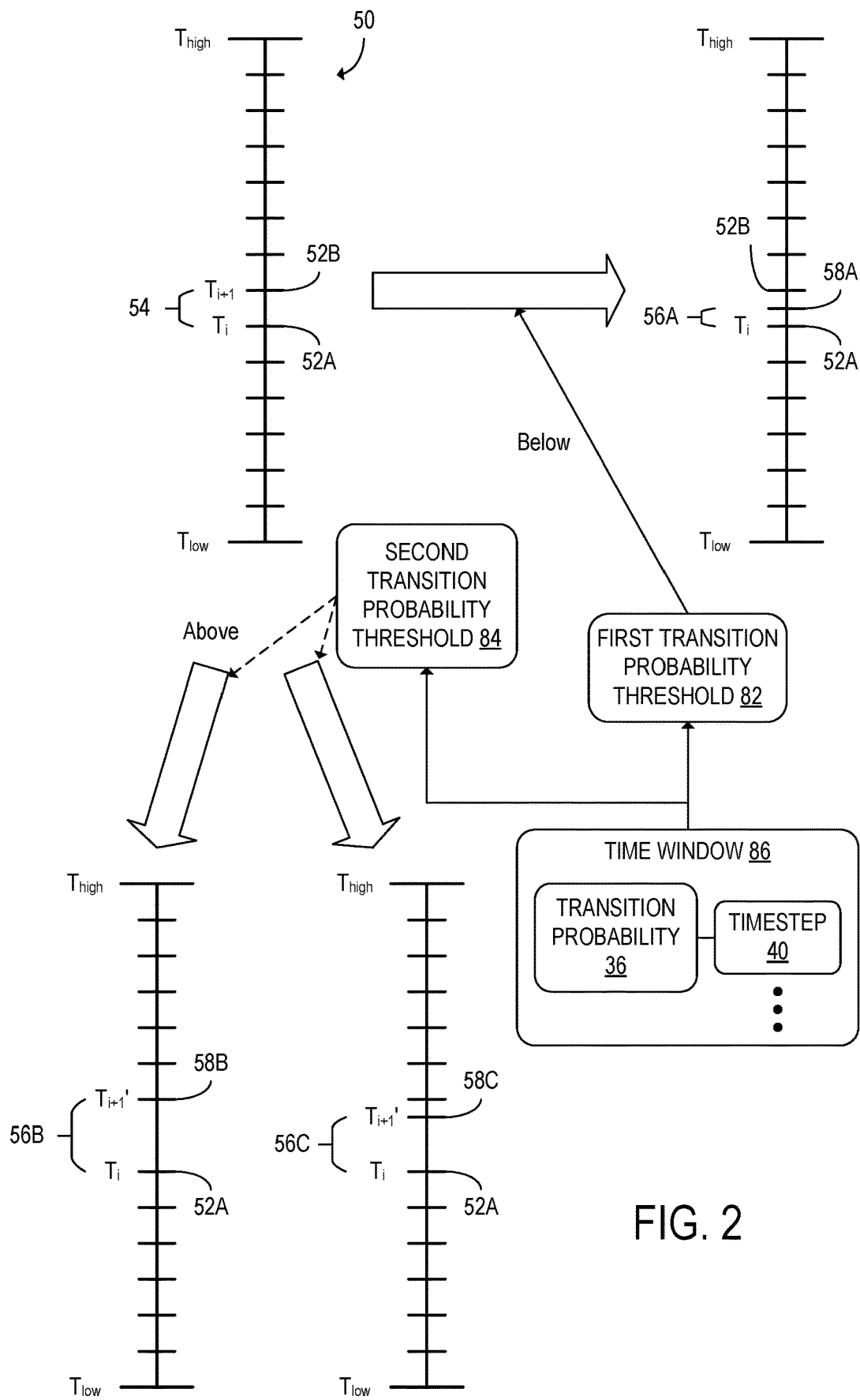
FIG. 2 shows example modifications to intermediate control parameter values included in a control parameter range, according to the embodiment of FIG. 1.

The processor 12 may be further configured to compute a plurality of intermediate control parameter values 52 within the control parameter range 50. An example control parameter range 50 with a plurality of intermediate control parameter values 52 is shown in FIG. 2. As depicted in FIG. 2, the plurality of intermediate control parameter values 52 may discretize the control parameter range 50 into a plurality of control parameter intervals 54. In the example of FIG. 2, the control parameter range 50 is a temperature range between a temperature lower bound $T_{low}$ and a temperature upper bound $T_{high}$.

In some embodiments, the processor 12 may be configured to compute the plurality of intermediate control parameter values 52 at least in part by defining a plurality of initial intermediate control parameter values 52A within the control parameter range 50. In the example of FIG. 2, the initial intermediate control parameter values are temperature values $T_i$ that are spaced evenly within the control parameter range 50.

For each initial intermediate control parameter value 52A, the processor 12 may be further configured to determine a transition probability 36 between that initial intermediate control parameter value 52A and an adjacent control parameter value 52B. In the example of FIG. 2, the adjacent control parameter value 52B is a temperature value $T_{i+1}$ that is directly above $T_i$ in the control parameter range 50. In other embodiments, the adjacent control parameter value 52B may be a control parameter value $T_{i-1}$ that is directly below $T_i$ in the control parameter range 50. The processor 12 may be configured to determine the transition probability between the initial intermediate control parameter value 52A and the adjacent control parameter value 52B for a time window 86 including a plurality of timesteps 40.

If the transition probability 36 computed for the time window 86 is below a first transition probability threshold 82, the processor 12 may be further configured to add an additional intermediate control parameter value 58A between the initial intermediate control parameter value 52A and the adjacent control parameter value 52B. Thus, when the transition probability 36 is low, the processor 12 may be configured to make the spacing between the intermediate control parameter values 52 narrower, as indicated by the first updated control parameter interval 56A in the example of FIG. 2. A narrower spacing between the intermediate control parameter values 52 may increase the transition probability 36 between the intermediate control parameter values 52 between which the additional intermediate control parameter value 58A is added.

If the transition probability 36 computed for the time window 86 is above a second transition probability threshold 84, the processor 12 may be further configured to delete the initial intermediate control parameter value 52A or the adjacent control parameter value 52B from the plurality of initial intermediate control parameter values 52A. In the example of FIG. 2, the adjacent control parameter value 52B may be deleted, which may result in the control parameter range 50 including a second updated control parameter interval 56B between the initial intermediate control parameter value 52A and an updated adjacent control parameter value 58B. In FIG. 2, the updated adjacent control parameter value 58B is indicated as $T_{i+1}'$, which was previously $T_{i+2}$.

Alternatively, when the transition probability 36 is above the second transition probability threshold 84, the processor 12 may be further configured to increase a distance between the initial intermediate control parameter value 52A and the adjacent control parameter value 52B. FIG. 2 shows an example in which the adjacent control parameter value 52B is moved upward to become an updated adjacent control parameter value 58C. The initial intermediate control parameter value 52A and the updated adjacent control parameter value 58C are separated by a third updated control parameter interval 56C.

In some embodiments, as shown in FIG. 3, the processor 12 may be further configured to estimate a diffusion speed 88 between the control parameter upper bound 32 and the control parameter lower bound 42. The diffusion speed 88 may be inversely proportional to a number of timesteps 40 over which a copy 70 of the cost function 20 moves from the control parameter upper bound 32 to the control parameter lower bound 42. The processor 12 may be configured to measure the diffusion speed 88 for a sample including a plurality of copies 70 of the cost function 20.

In some embodiments, the processor 12 may additionally or alternatively be configured to determine respective diffusion speeds 88 for one or more sub-ranges 94 of the control parameter range 50. In such embodiments, the diffusion speed 88 across a sub-range 94 may be inversely proportional to a number of timesteps 40 over which a copy 70 of the cost function 20 moves from the upper end of the sub-range 94 to the lower end of the sub-range 94.

When the diffusion speed 88 is below a predetermined diffusion speed threshold 92, the processor 12 may be further configured to add at least one additional intermediate control parameter value 58A to the plurality of intermediate control parameter values 52. In the example of FIG. 3, the processor 12 adds the additional intermediate control parameter value 58A between the initial intermediate control parameter value 52A and the adjacent control parameter value 52B, similarly to in FIG. 2. In embodiments in which the processor 12 determines respective diffusion speeds 88 for one or more sub-ranges 94 of the control parameter range 50, the additional intermediate control parameter value 58A may be added within a sub-range 94 that has a diffusion speed 88 below the diffusion speed threshold 92. Thus, the processor 12 may increase the diffusion speed across a sub-range 94 that would otherwise act as a bottleneck in the diffusion process and prevent efficient searching of the control parameter range 50. FIG. 3 further shows a first example plot 90A of the transition probability 36 $p$ as a function of the temperature T prior to adding the additional intermediate control parameter value 58. When the additional intermediate control parameter value 58 is added, the transition probability curve is flattened such that there is less of a bottleneck in the sub-range 94 to which the additional intermediate control parameter value 58 was added, as shown in the second example plot 90B.

Returning to FIG. 1, once the control parameter upper bound 32, the control parameter lower bound 42, and the plurality of intermediate control parameter values 52 have been computed, the processor 12 may be further configured to compute an estimated minimum 76 or an estimated maximum 78 of the cost function 20 using the stochastic simulation algorithm 30 with the control parameter upper bound 32, the control parameter lower bound 42, and the plurality of intermediate control parameter values 52. The processor 12 may be configured to compute the estimated minimum 76 or estimated maximum 78 by simulating a plurality of copies 70 of the cost function 20 with a respective plurality of seed values 72. As discussed above, each seed value 72 may be a random or pseudorandom number, and each copy 70 may be simulated for a plurality of timesteps 40.

Figure 4A:
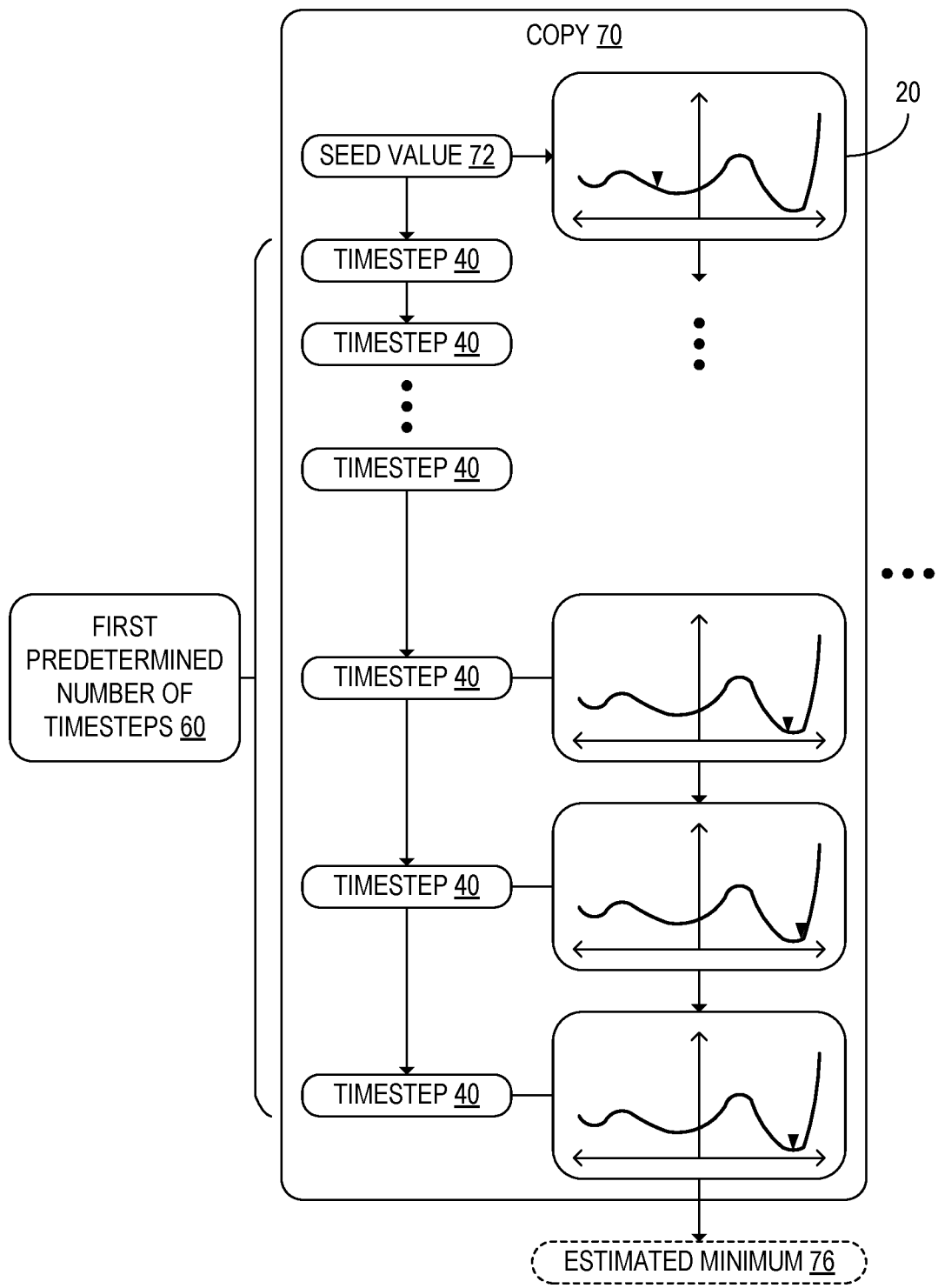
FIG. 4A shows an example computation of an estimated minimum of a cost function, according to the embodiment of FIG. 1.

In some embodiments, the processor 12 may be configured to execute the stochastic simulation algorithm 30 for a first predetermined number of timesteps 60. FIG. 4A shows an example determination of the estimated minimum 76 by executing the stochastic simulation algorithm 30 on a copy 70 of the cost function 20 for the first predetermined number of timesteps 60. In the example of FIG. 4A, the copy 70 is initialized with a seed value 72. When the first predetermined number of timesteps 60 has elapsed, the stochastic simulation algorithm 30 outputs the estimated minimum 76. The estimated minimum 76 may be a lowest value of the cost function 20 among the plurality of copies 70.

Figure 4B:
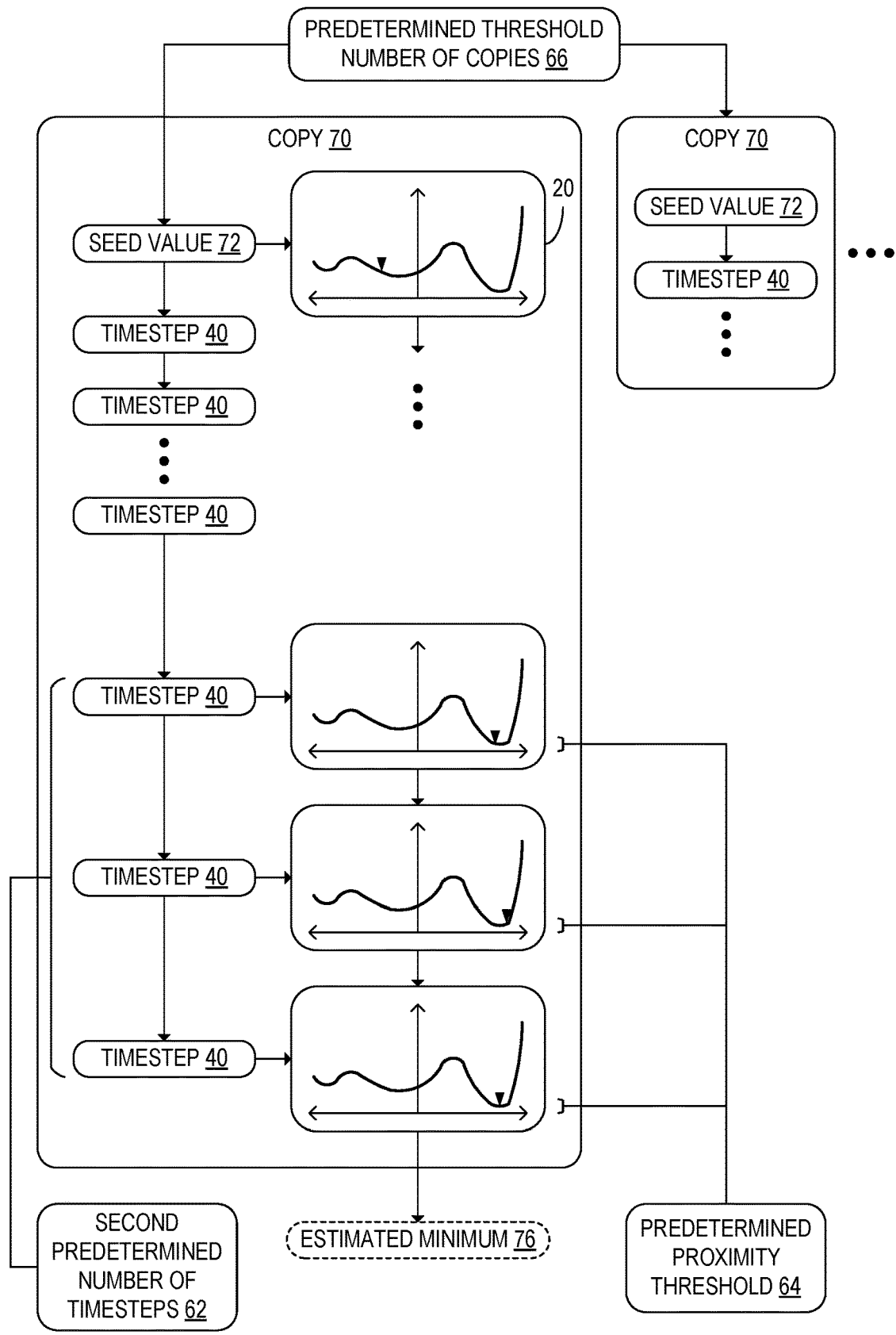
FIG. 4B shows another an example computation of an estimated minimum of a cost function, according to the embodiment of FIG. 1.

Alternatively, as shown in FIG. 4B, the processor 12 may be configured to execute the stochastic simulation algorithm 30 until at least a predetermined threshold number of copies 66 are within a predetermined proximity threshold 64 from each other for a second predetermined number of timesteps 62. In some embodiments, the processor 12 may be configured to determine, at a predetermined timestep interval, whether a number of copies 70 greater than or equal to the predetermined threshold number of copies 66 are within the predetermined proximity threshold 64 from each other. When enough copies 70 are determined to be within the predetermined proximity threshold 64, the processor 12 may be further configured to determine, for each timestep 40 of the second predetermined number of timesteps 62 after the copies 70 are determined to be within the predetermined proximity threshold 64, whether a predetermined threshold number of copies 66 are still within the predetermined proximity threshold 64 from each other. If a number of copies 70 greater than the predetermined threshold number of copies 66 continue to meet the predetermined proximity threshold for the second predetermined number of timesteps 62, the processor 12 may output the estimated minimum 76 of the cost function 20 after the predetermined number of timesteps 62 has elapsed. The estimated minimum 76 may be a lowest value of the cost function 20 among the plurality of copies 70.

Although FIGS. 4A-4B show an estimated minimum 76, the processes shown in FIGS. 4A-4B and discussed above may alternatively be used to determine an estimated maximum 78 of the cost function 20.

Figure 5:
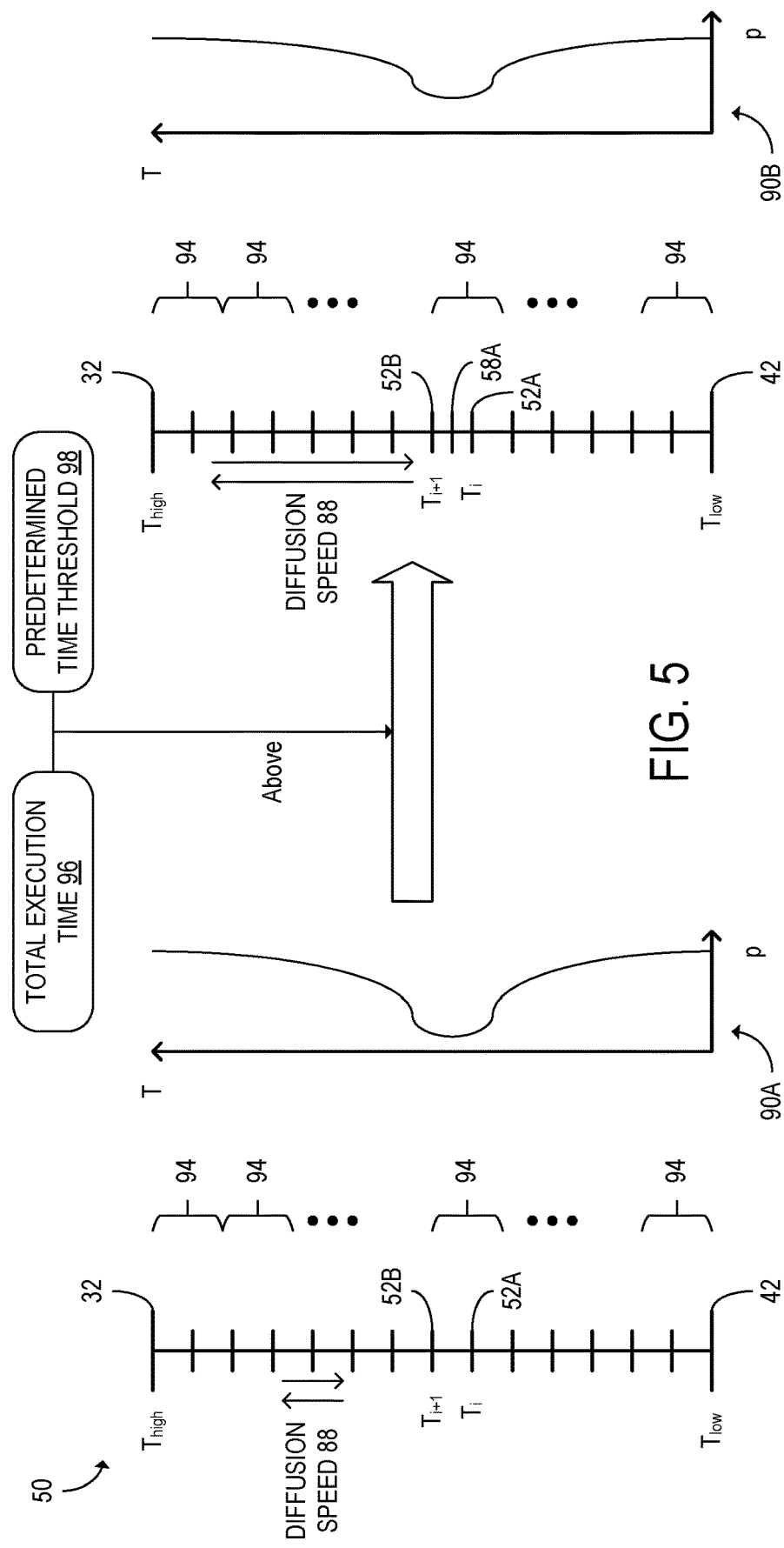
FIG. 5 shows another example modification to the intermediate control parameter values of a control parameter range based on a diffusion speed, according to the embodiment of FIG. 1.

In some embodiments, the processor 12 may be further configured to dynamically modify the respective control parameters 74 used for one or more copies 70 of the cost function 20 when the stochastic simulation algorithm 30 has run for a large number of timesteps 40. In such embodiments, as shown in FIG. 5, computing the estimated minimum 76 or the estimated maximum 78 may further include determining that a total execution time 96 of the plurality of the copies 70 has exceeded a predetermined time threshold 98. In response to determining that the total execution time 96 has exceeded the predetermined time threshold 98, the processor 12 may be further configured to estimate the diffusion speed 88 between the control parameter upper bound 32 and the control parameter lower bound 42. Based on the diffusion speed 88, the processor 12 may be further configured to add at least one additional intermediate control parameter value 58A to the plurality of intermediate control parameter values 52, as shown in FIG. 5. In some embodiments, the processor 12 may be configured to determine one or more respective diffusion speeds 88 for one or more sub-ranges 94 and add the at least one additional intermediate control parameter value 58A based on the one or more diffusion speeds 88 of the one or more sub-ranges 94.

Figure 6:
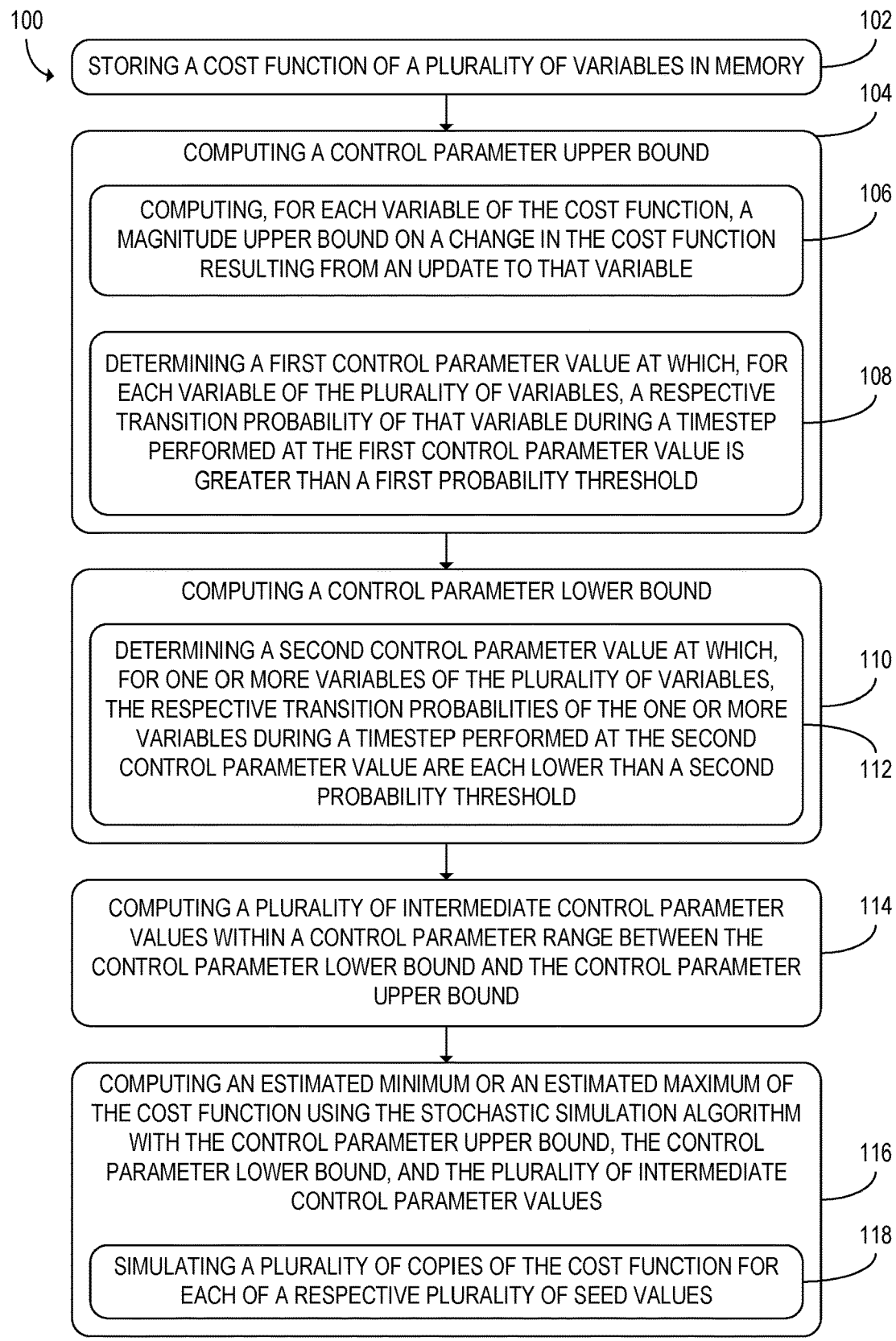
FIG. 6 shows an example method for use with a computing device, according to the embodiment of FIG. 1.

FIG. 6 shows a flowchart of an example method 100 that may be used with a computing device. The method 100 may be used with the computing device 10 of FIG. 1. At step 102, the method 100 may include storing a cost function of a plurality of variables in memory. The cost function may be a scalar-valued function of a plurality of continuous and/or discrete variables. The method 100 may further include a plurality of steps in which a stochastic simulation algorithm is executed at a processor of the computing device, as discussed below. For example, the stochastic simulation algorithm may be a simulated annealing algorithm, a simulated quantum annealing algorithm, a parallel tempering algorithm, a diffusion Monte Carlo algorithm, a population annealing algorithm, or a sub-stochastic Monte Carlo algorithm.

At step 104, the method 100 may further include computing a control parameter upper bound for the stochastic simulation algorithm. The control parameter may be a numerical setting of the stochastic simulation algorithm that is not included in the cost function. For example, in physics-based stochastic simulation algorithms, the control parameter may be a temperature, a frequency, a field strength, or a combination thereof. In some embodiments, at step 106, step 104 may include computing, for each variable of the cost function, a magnitude upper bound on a change in the cost function resulting from an update to that variable. For example, when the stochastic simulation algorithm is a parallel tempering algorithm, the cost function upper bound may be computed from the magnitude upper bound and when the transition probability is set to a predetermined value.

Additionally or alternatively, step 104 may further include, at step 108, determining a first control parameter value at which, for each variable of the plurality of variables, a respective transition probability of that variable during a timestep performed at the first control parameter value is greater than a first probability threshold. This first control parameter value may be used as the control parameter upper bound.

At step 110, the method 100 may further include computing a control parameter lower bound. Step 110 may include, at step 112, determining a second control parameter value at which, for one or more variables of the plurality of variables, the respective transition probabilities of the one or more variables during a timestep performed at the second control parameter value are each lower than a second probability threshold. This second control parameter value may be used as the control parameter lower bound. In such embodiments, the control parameter lower bound may be determined at least in part by starting the control parameter at the control parameter upper bound and iteratively lowering the control parameter until the transition probabilities of the one or more variables pass the second probability threshold.

At step 114, the method 100 may further include computing a plurality of intermediate control parameter values within a control parameter range between the control parameter lower bound and the control parameter upper bound. These intermediate control parameter values may discretize the control parameter range into a plurality of intervals. When the stochastic simulation algorithm moves between control parameter values, the stochastic simulation algorithm may move to and from the control parameter upper bound, the control parameter lower bound, and the intermediate control parameter values such that the control parameter is only set to the above values.

At step 116, the method 100 may further include computing an estimated minimum or an estimated maximum of the cost function using the stochastic simulation algorithm with the control parameter upper bound, the control parameter lower bound, and the plurality of intermediate control parameter values. Step 116 may include, at step 118, simulating a plurality of copies of the cost function with a respective plurality of seed values. The estimated minimum or the estimated maximum may be a respective highest value or lowest value of the cost function that is reached by one or more of the copies.

Figure 7:
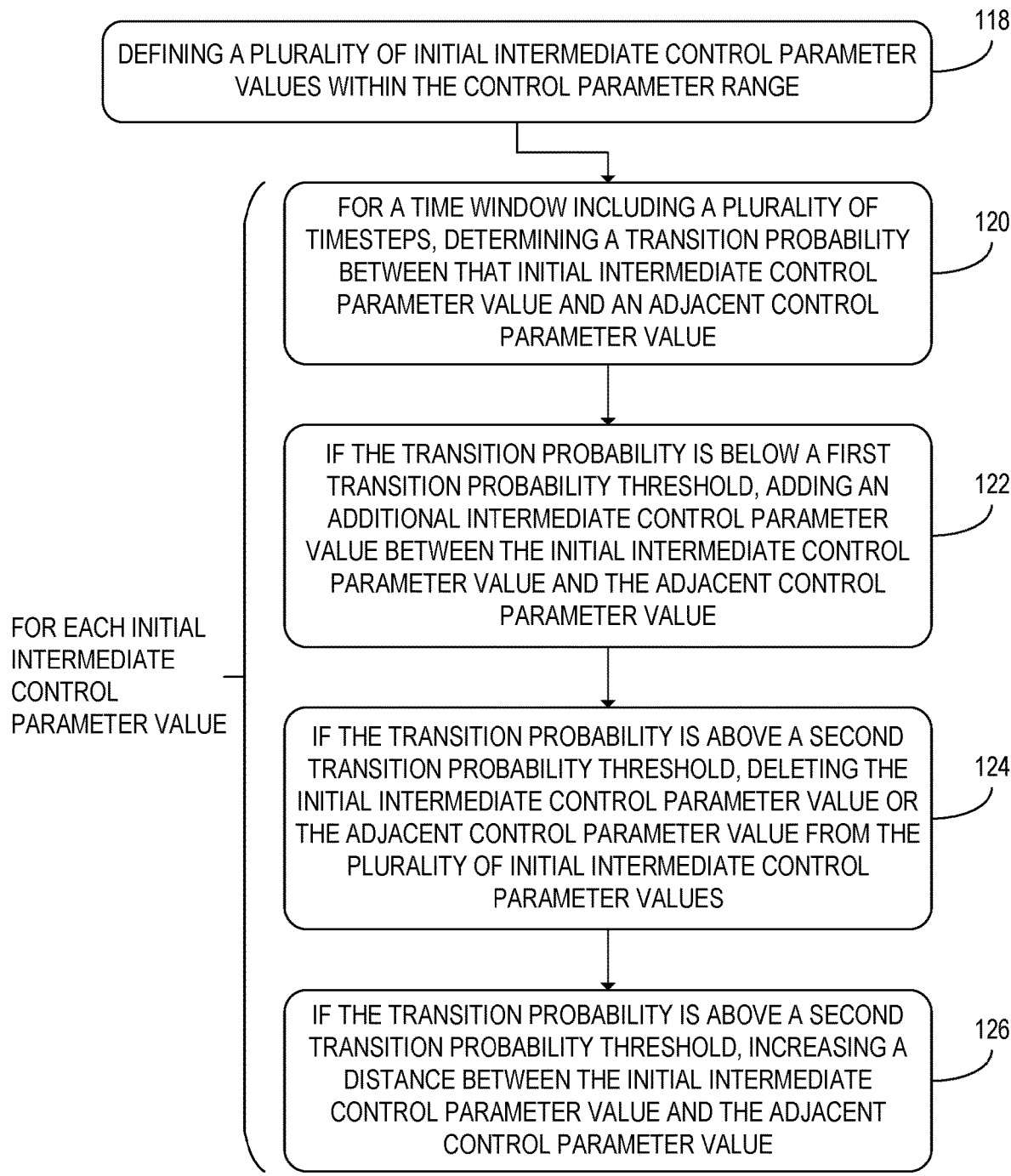
FIGS. 7 and 8 show additional steps of the method of FIG. 5 that may be performed in some embodiments.

FIG. 7 shows additional steps of the method 100 that may be performed in some embodiments when computing the plurality of intermediate control parameter values at step 114. At step 118, the method 100 may further include defining a plurality of initial intermediate control parameter values within the control parameter range. In some embodiments, the plurality of initial intermediate control parameter values may be evenly spaced. Alternatively, the plurality of initial intermediate control parameter values may be distributed according to a logarithmic scale or may have some other spacing.

For each initial intermediate control parameter value, the method 100 may further include, at step 120, determining a transition probability between that initial intermediate control parameter value and an adjacent control parameter value. The transition probability may be determined for a time window including a plurality of timesteps, such that the transition probability is a probability that the stochastic simulation algorithm transitions from the initial intermediate control parameter value to the adjacent control parameter value within the time window. The adjacent control parameter value may be a control parameter value above or below the initial intermediate control parameter value.

At step 122, if the transition probability is below a first transition probability threshold, the method 100 may further include adding an additional intermediate control parameter value between the intermediate control parameter and the adjacent control parameter value. Adding the additional intermediate control parameter value may increase the transition probability between the initial intermediate control parameter value and the adjacent control parameter value by allowing the stochastic simulation algorithm to move between the initial intermediate control parameter value and the adjacent control parameter value through the additional intermediate control parameter value.

At step 124, if the transition probability is above a second transition probability threshold, the method 100 may further include deleting the initial intermediate control parameter value or the adjacent control parameter value from the plurality of initial intermediate control parameter values. Alternatively, at step 126, the method 100 may further include increasing a distance between the initial intermediate control parameter value and the adjacent control parameter value. Performing step 124 or step 126 may decrease the transition probability in the region of the control parameter range in which a control parameter value is deleted or the distance between control parameter values is increased.

In some embodiments, steps 120 through 126 may be iteratively performed on the plurality of intermediate control parameter values in order to determine a spacing of control parameter values that allows the state space of the cost function to be searched efficiently.

Figure 8:
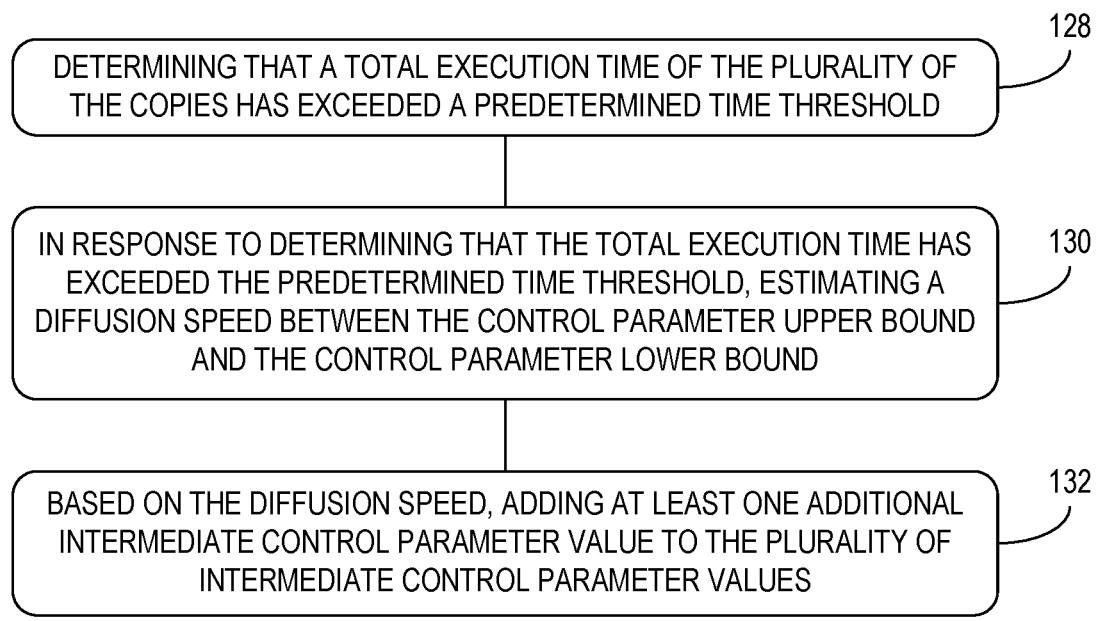

FIG. 8 shows additional steps that may be included in the method 100 in some embodiments. The steps shown in FIG. 8 may be performed at step 114 when computing the plurality of intermediate control parameter values. At step 128, the method 100 may further include determining that a total execution time of the plurality of the copies has exceeded a predetermined time threshold. The total execution time may be a number of timesteps for which the stochastic simulation algorithm has run, and the predetermined time threshold may be a predetermined number of timesteps.

At step 130, the method 100 may further include, in response to determining that the total execution time has exceeded the predetermined time threshold, estimating a diffusion speed between the control parameter upper bound and the control parameter lower bound. The diffusion speed may be inversely proportional to a number of timesteps over which at least one copy of the cost function simulated by the stochastic simulation algorithm moves from the control parameter upper bound to the control parameter lower bound. The diffusion speed may be estimated, for example, by computing an average diffusion speed for a plurality of copies of the cost function. In some embodiments, one or more diffusion speeds may be determined for one or more sub-ranges of the control parameter range.

At step 132, the method 100 may further include, based on the diffusion speed, adding at least one additional intermediate control parameter value to the plurality of intermediate control parameter values. In embodiments in which one or more diffusion speeds are estimated for one or more respective subranges of the control parameter range, at least one additional intermediate control parameter value may be added to each sub-range with a respective estimated diffusion speed below a predetermined diffusion speed threshold.

Although the above systems and methods are described with reference to one control parameter, the stochastic simulation algorithm may have a plurality of control parameters in some embodiments. In such embodiments, the above systems and methods may be used to set some or all of the plurality of control parameters of the stochastic simulation algorithm.

Using the systems and methods described above, the parameters of a stochastic simulation algorithm for estimating a minimum or maximum of a cost function may be tuned for the specific cost function with which it is used. In addition, one or more parameters of the stochastic simulation algorithm may be dynamically adjusted as the stochastic simulation algorithm is running in order to more quickly reach an accurate estimate of the minimum or maximum of the cost function. Thus, the above systems and methods may result in large computation cost and time savings compared to existing methods in which the parameters are not adjusted based on the cost function. In addition, the systems and methods described above allow the parameters of the stochastic simulation algorithm may be set programmatically rather than being entered manually by the user. This may allow users to more easily utilize the stochastic simulation algorithm due to having to specify fewer inputs.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
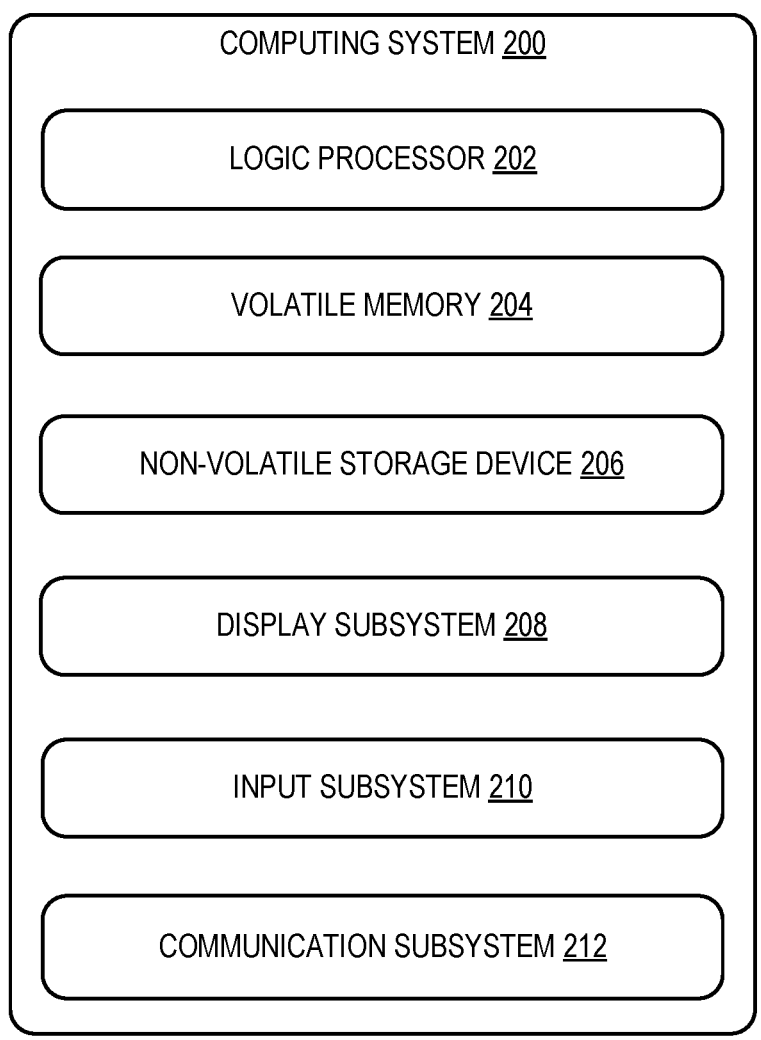
FIG. 9 shows a schematic view of an example computing environment in which the computer device of FIG. 1 may be enacted.

FIG. 9 schematically shows a non-limiting embodiment of a computing system 200 that can enact one or more of the methods and processes described above. Computing system 200 is shown in simplified form. Computing system 200 may embody the computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 9.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

According to one aspect of the present disclosure, a computing device is provided, including memory storing a cost function of a plurality of variables. The computing device may further include a processor configured to, for a stochastic simulation algorithm, compute a control parameter upper bound, compute a control parameter lower bound, and compute a plurality of intermediate control parameter values within a control parameter range between the control parameter lower bound and the control parameter upper bound. The processor may be further configured to compute an estimated minimum or an estimated maximum of the cost function using the stochastic simulation algorithm with the control parameter upper bound, the control parameter lower bound, and the plurality of intermediate control parameter values. A plurality of copies of the cost function may be simulated with a respective plurality of seed values.

According to this aspect, the stochastic simulation algorithm may be a simulated annealing algorithm, a simulated quantum annealing algorithm, a parallel tempering algorithm, a diffusion Monte Carlo algorithm, a population annealing algorithm, or a sub-stochastic Monte Carlo algorithm.

According to this aspect, the control parameter may be a temperature.

According to this aspect, the processor may be configured to compute the control parameter upper bound at least in part by computing, for each variable of the cost function, a magnitude upper bound on a change in the cost function resulting from an update to that variable.

According to this aspect, the control parameter upper bound may be a first control parameter value at which, for each variable of the plurality of variables, a respective transition probability of that variable during a timestep performed at the first control parameter value is greater than a first probability threshold.

According to this aspect, the control parameter lower bound may be a second control parameter value at which, for one or more variables of the plurality of variables, the respective transition probabilities of the one or more variables during a timestep performed at the second control parameter value are each lower than a second probability threshold.

According to this aspect, the control parameter lower bound may be a second control parameter value at which a sum of the respective transition probabilities of the plurality of variables during a timestep performed at the second control parameter value is lower than a total probability threshold.

According to this aspect, the processor is configured to compute the plurality of intermediate control parameter values at least in part by defining a plurality of initial intermediate control parameter values within the control parameter range. Computing the plurality of intermediate control parameter values may further include, for each initial intermediate control parameter value, for a time window including a plurality of timesteps, determining a transition probability between that initial intermediate control parameter value and an adjacent control parameter value. For each initial intermediate control parameter value, if the transition probability is below a first transition probability threshold, computing the plurality of intermediate control parameter values may further include adding an additional intermediate control parameter value between the initial intermediate control parameter value and the adjacent control parameter value.

According to this aspect, if the transition probability is above a second transition probability threshold, the processor may be further configured to delete the initial intermediate control parameter value or the adjacent control parameter value from the plurality of initial intermediate control parameter values.

According to this aspect, if the transition probability is above a second transition probability threshold, the processor may be further configured to increase a distance between the initial intermediate control parameter value and the adjacent control parameter value.

According to this aspect, the processor may be further configured to estimate a diffusion speed between the control parameter upper bound and the control parameter lower bound. The processor may be further configured to, when the diffusion speed is below a predetermined diffusion speed threshold, add at least one additional intermediate control parameter value to the plurality of intermediate control parameter values.

According to this aspect, the processor may be configured to execute the stochastic simulation algorithm for a first predetermined number of timesteps.

According to this aspect, the processor may be configured to execute the stochastic simulation algorithm until at least a predetermined threshold number of the copies are within a predetermined proximity threshold from each other for a second predetermined number of timesteps.

According to another aspect of the present disclosure, a method for use with a computing device is provided. The method may include storing a cost function of a plurality of variables in memory. The method may further include, for a stochastic simulation algorithm, computing a control parameter upper bound, computing a control parameter lower bound, and computing a plurality of intermediate control parameter values within a control parameter range between the control parameter lower bound and the control parameter upper bound. The method may further include computing an estimated minimum or an estimated maximum of the cost function using the stochastic simulation algorithm with the control parameter upper bound, the control parameter lower bound, and the plurality of intermediate control parameter values. Computing the estimated minimum or the estimated maximum may include simulating a plurality of copies of the cost function with a respective plurality of seed values.

According to this aspect, the stochastic simulation algorithm may be a simulated annealing algorithm, a simulated quantum annealing algorithm, a parallel tempering algorithm, a diffusion Monte Carlo algorithm, a population annealing algorithm, or a sub-stochastic Monte Carlo algorithm.

According to this aspect, the control parameter upper bound may be a first control parameter value at which, for each variable of the plurality of variables, a respective transition probability of that variable during a timestep performed at the first control parameter value is greater than a first probability threshold.

According to this aspect, the control parameter lower bound may be a second control parameter value at which, for one or more variables of the plurality of variables, the respective transition probabilities of the one or more variables during a timestep performed at the second control parameter value are each lower than a second probability threshold.

According to this aspect, computing the plurality of intermediate control parameter values may include defining a plurality of initial intermediate control parameter values within the control parameter range. Computing the plurality of intermediate control parameters may further include, for each initial intermediate control parameter value, for a time window including a plurality of timesteps, determining a transition probability between that initial intermediate control parameter value and an adjacent control parameter value. For each initial intermediate control parameter value, if the transition probability is below a first transition probability threshold, computing the plurality of intermediate control parameters may further include adding an additional intermediate control parameter value between the initial intermediate control parameter value and the adjacent control parameter value.

According to this aspect, if the transition probability is above a second transition probability threshold, the method may further include deleting the initial intermediate control parameter value or the adjacent control parameter value from the plurality of initial intermediate control parameter values or increasing a distance between the initial intermediate control parameter value and the adjacent control parameter value.

According to another aspect of the present disclosure, a computing device is provided, including memory storing a cost function of a plurality of variables. The computing device may further include a processor configured to, for a stochastic simulation algorithm, compute a control parameter upper bound, compute a control parameter lower bound, and compute a plurality of intermediate control parameter values within a control parameter range between the control parameter lower bound and the control parameter upper bound. The processor may be further configured to compute an estimated minimum or an estimated maximum of the cost function using the stochastic simulation algorithm with the control parameter upper bound, the control parameter lower bound, and the plurality of intermediate control parameter values. Computing the estimated minimum or the estimated maximum may include simulating a plurality of copies of the cost function with a respective plurality of seed values. Computing the estimated minimum or the estimated maximum may further include determining that a total execution time of the plurality of the copies has exceeded a predetermined time threshold. Computing the estimated minimum or the estimated maximum may further include, in response to determining that the total execution time has exceeded the predetermined time threshold, estimating a diffusion speed between the control parameter upper bound and the control parameter lower bound. Computing the estimated minimum or the estimated maximum may further include, based on the diffusion speed, adding at least one additional intermediate control parameter value to the plurality of intermediate control parameter values.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A storage device storing instructions executable by one or more logic processors to cause the one or more logic processors to perform steps of:
   storing a cost function of a plurality of variables in memory; and
   for a stochastic simulation algorithm:
      computing a control parameter upper bound;
      computing a control parameter lower bound; and
      computing a plurality of intermediate control parameter values within a control parameter range between the control parameter lower bound and the control parameter upper bound; and
   computing an estimated minimum or an estimated maximum of the cost function using the stochastic simulation algorithm with the control parameter upper bound, the control parameter lower bound, and the plurality of intermediate control parameter values, wherein, when computing the estimated minimum or the estimated maximum:
      a plurality of copies of the cost function are simulated with a respective plurality of seed values;
      for at least one copy of the plurality of copies, a respective diffusion speed across at least one sub-range of the control parameter range is computed; and
      one or more additional intermediate control parameter values within the at least one sub-range are added based at least in part on the diffusion speed.

2. The storage device of claim 1, wherein the stochastic simulation algorithm is a simulated annealing algorithm, a simulated quantum annealing algorithm, a parallel tempering algorithm, a diffusion Monte Carlo algorithm, a population annealing algorithm, or a sub-stochastic Monte Carlo algorithm.

3. The storage device of claim 2, wherein the control parameter is a temperature.

4. The storage device of claim 1, wherein the instructions cause the one or more logic processors to compute the control parameter upper bound at least in part by computing, for each variable of the cost function, a magnitude upper bound on a change in the cost function resulting from an update to that variable.

5. The storage device of claim 1, wherein the control parameter upper bound is a first control parameter value at which, for each variable of the plurality of variables, a respective transition probability of that variable during a timestep performed at the first control parameter value is greater than a first probability threshold.

6. The storage device of claim 5, wherein the control parameter lower bound is a second control parameter value at which, for one or more variables of the plurality of variables, the respective transition probabilities of the one or more variables during a timestep performed at the second control parameter value are each lower than a second probability threshold.

7. The storage device of claim 5, wherein the control parameter lower bound is a second control parameter value at which a sum of the respective transition probabilities of the plurality of variables during a timestep performed at the second control parameter value is lower than a total probability threshold.

8. The storage device of claim 1, wherein the instructions cause the one or more logic processors to compute the plurality of intermediate control parameter values at least in part by:
defining a plurality of initial intermediate control parameter values within the control parameter range; and
for each initial intermediate control parameter value:
for a time window including a plurality of timesteps, determining a transition probability between that initial intermediate control parameter value and an adjacent control parameter value; and
if the transition probability is below a first transition probability threshold, adding an additional intermediate control parameter value of the one or more additional intermediate control parameter values between the initial intermediate control parameter value and the adjacent control parameter value.

9. The storage device of claim 8, wherein:
the plurality of initial intermediate control parameter values are computed prior to execution of the stochastic simulation algorithm; and
the additional intermediate control parameter value is added during execution of the stochastic simulation algorithm.

10. The storage device of claim 9, wherein the instructions cause the one or more logic processors to:
determine that a total execution time of the stochastic simulation algorithm has exceeded a predetermined time threshold; and
add the one or more additional intermediate control parameter values in response to determining that the total execution time has exceeded the predetermined time threshold.

11. The storage device of claim 8, wherein, if the transition probability is above a second transition probability threshold, the instructions cause the one or more logic processors to:
delete the initial intermediate control parameter value or the adjacent control parameter value from the plurality of initial intermediate control parameter values; or
increase a distance between the initial intermediate control parameter value and the adjacent control parameter value.

12. The storage device of claim 1, wherein the instructions cause the one or more logic processors to execute the stochastic simulation algorithm until at least a predetermined threshold number of the copies are within a predetermined proximity threshold from each other for a second predetermined number of timesteps.

13. The storage device of claim 1, wherein the instructions cause the one or more logic processors to:
determine that the diffusion speed across the at least one sub-range is below a predetermined diffusion speed threshold; and
add the one or more additional intermediate control parameter values in response to determining that the diffusion speed is below the predetermined diffusion speed threshold.

14. A method for use with a computing device, the method comprising:
storing a cost function of a plurality of variables in memory; and
for a stochastic simulation algorithm:
computing a control parameter upper bound;
computing a control parameter lower bound; and
computing a plurality of intermediate control parameter values within a control parameter range between the control parameter lower bound and the control parameter upper bound; and
computing an estimated minimum or an estimated maximum of the cost function using the stochastic simulation algorithm with the control parameter upper bound, the control parameter lower bound, and the plurality of intermediate control parameter values, wherein, when computing the estimated minimum or the estimated maximum:
a plurality of copies of the cost function are simulated with a respective plurality of seed values;
for at least one copy of the plurality of copies, a respective diffusion speed across at least one sub-range of the control parameter range is computed; and
one or more additional intermediate control parameter values within the at least one sub-range are added based at least in part on the diffusion speed.

15. The method of claim 14, wherein computing the plurality of intermediate control parameter values includes:
defining a plurality of initial intermediate control parameter values within the control parameter range; and
for each initial intermediate control parameter value:
for a time window including a plurality of timesteps, determining a transition probability between that initial intermediate control parameter value and an adjacent control parameter value; and
if the transition probability is below a first transition probability threshold, adding an additional intermediate control parameter value of the one or more additional intermediate control parameter values between the initial intermediate control parameter value and the adjacent control parameter value.

16. The method of claim 15, wherein:
the plurality of initial intermediate control parameter values are computed prior to execution of the stochastic simulation algorithm; and
the additional intermediate control parameter value is added during execution of the stochastic simulation algorithm.

17. The method of claim 16, further comprising:
determining that a total execution time of the stochastic simulation algorithm has exceeded a predetermined time threshold; and
adding the one or more additional intermediate control parameter values in response to determining that the total execution time has exceeded the predetermined time threshold.

18. The method of claim 15, further comprising, if the transition probability is above a second transition probability threshold:
deleting the initial intermediate control parameter value or the adjacent control parameter value from the plurality of initial intermediate control parameter values; or
increasing a distance between the initial intermediate control parameter value and the adjacent control parameter value.

19. The method of claim 14, further comprising:
determining that the diffusion speed across the at least one sub-range is below a predetermined diffusion speed threshold; and
adding the one or more additional intermediate control parameter values in response to determining that the diffusion speed is below the predetermined diffusion speed threshold.

20. A computing device comprising:
memory storing a cost function of a plurality of variables; and
a processor configured to:
compute a control parameter upper bound;
compute a control parameter lower bound; and
compute a plurality of intermediate control parameter values within a control parameter range between the control parameter lower bound and the control parameter upper bound; and
compute an estimated minimum or an estimated maximum of the cost function using a stochastic simulation algorithm with the control parameter upper bound, the control parameter lower bound, and the plurality of intermediate control parameter values, wherein computing the estimated minimum or the estimated maximum includes:
simulating a plurality of copies of the cost function with a respective plurality of seed values;
determining that a total execution time of the plurality of the copies has exceeded a predetermined time threshold;
in response to determining that the total execution time has exceeded the predetermined time threshold, estimating a respective diffusion speed across at least one sub-range of a control parameter range between the control parameter upper bound and the control parameter lower bound; and
based at least in part on the diffusion speed, adding at least one additional intermediate control parameter value to the plurality of intermediate control parameter values.

* * * * *